May 11, 1937.  M. B. MORGAN  2,079,746
SELF LOCKING NUT AND METHOD OF MAKING SAME
Filed Feb. 26, 1934   2 Sheets—Sheet 1

Inventor
Mathew B. Morgan
By Strauch + Hoffman
Attorneys

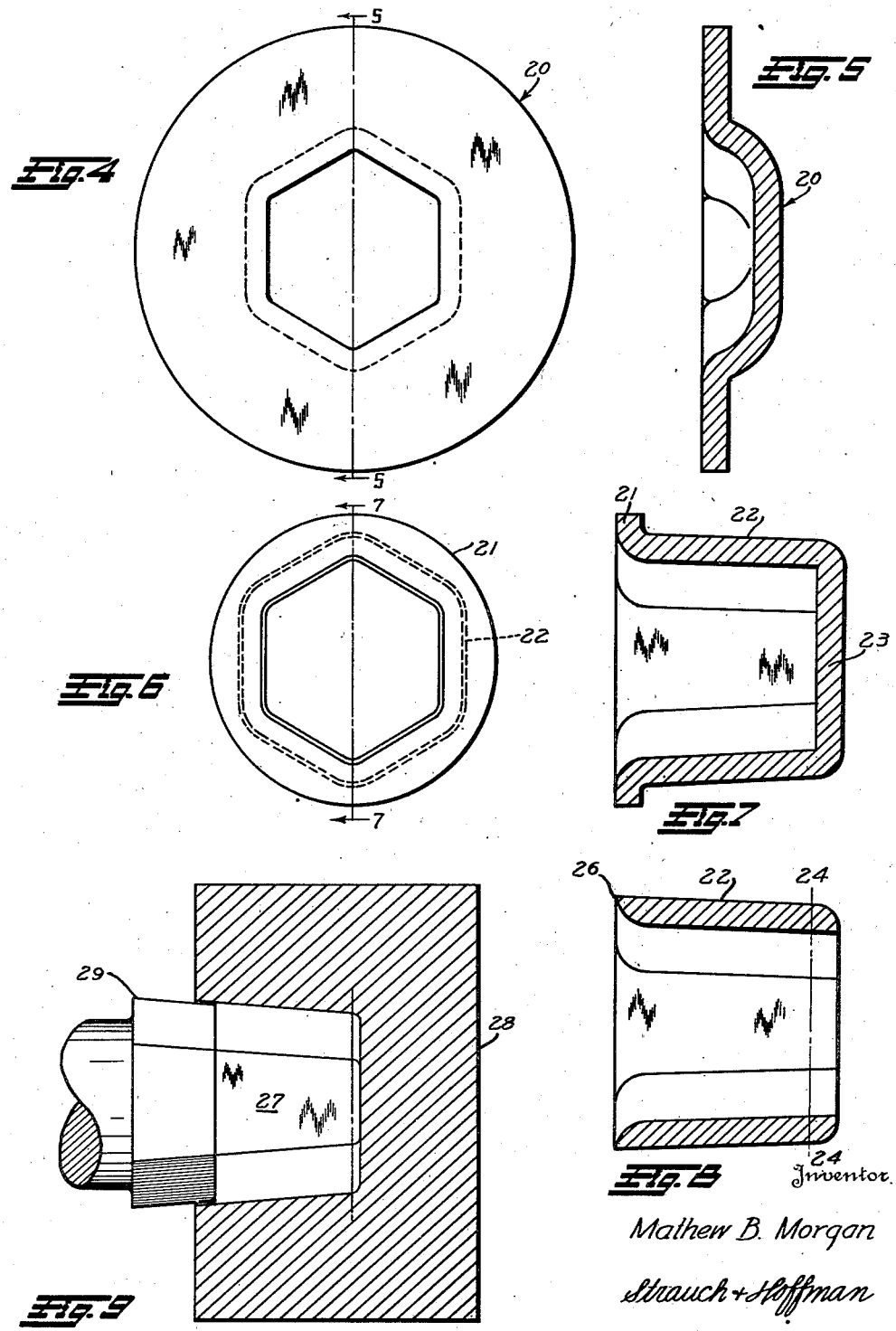

Patented May 11, 1937

2,079,746

UNITED STATES PATENT OFFICE 2,079,746

SELF-LOCKING NUT AND METHOD OF MAKING SAME

Mathew B. Morgan, Detroit, Mich., assignor to The Timken-Detroit Axle Company, Detroit, Mich., a corporation of Ohio Application February 26, 1934, Serial No. 713,027

9 Claims. (Cl. 10—86)

This invention relates to a self-locking nut and method of manufacturing the same.

It is a primary object of this invention to provide a self-locking nut which will be inexpensive to manufacture.

Another object of this invention is to provide a simple and inexpensive method of manufacturing a friction lock nut.

A further object of this invention is to provide a friction lock nut in which the separate pieces are formed by simple stamping and die-pressing operations. In this connection it is also an object to provide a self-locking nut comprising a plurality of members in which one of the members is formed by stamping operations performed upon a blank of uniform thickness.

Another object of this invention is to provide a self-locking nut comprising a plurality of members one of which is a stamping having a tapered internal hexagonal surface formed during the stamping operation.

Another object of this invention is to provide a friction lock nut which maintains its locking action over a substantial axial travel of the nut.

This invention further contemplates the provision of a lock nut in which the outer surface is hexagonal and slightly inclined inwardly to prevent a wrench from moving axially outward from the nut.

Prior to my invention various types of self-locking nuts have been proposed, but none has attained commercial success because of the excessive cost of manufacture.

In prior proposed devices of the type which are the subject of this invention, tapered internal surfaces on one of the members had to be produced by machining. It will readily appear to one skilled in the art that it is a very expensive operation to machine a tapered internal surface. In accordance with this invention a friction lock nut is provided in which only the simple machining operations, tapping a hole and cutting a slot, are necessary. These simple operations can be performed rapidly in quantity production at low cost.

A satisfactory embodiment of the invention and a preferred method of manufacture will now be clearly described and set forth in connection with the accompanying drawings in which:

Figure 4 is a horizontal view of a blank member from which the outer member is made, after the stamping operation has just started.

Figure 5 is a cross-sectional view along the line 5—5 in Figure 4.

Figure 6 is a horizontal view of the stamping shown in Figure 4, after the stamping operation has been completed.

Figure 7 is a cross sectional view along line 7—7 in Figure 6.

Figure 8 shows the stamping of Figure 7 after certain trimming operations have been performed thereon.

Figure 9 is a view showing the upsetting operation in which the inner member of the nut assembly is formed before being threaded and slotted.

Figure 1:
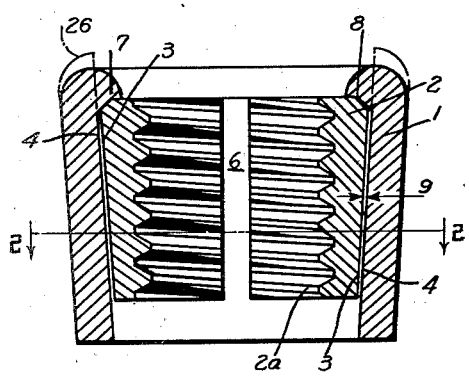
Figure 1 is a vertical sectional view along the axis of a lock nut assembled in unlocked position and showing the tapered surfaces on the inner and outer members of the lock nut.
Figure 2:
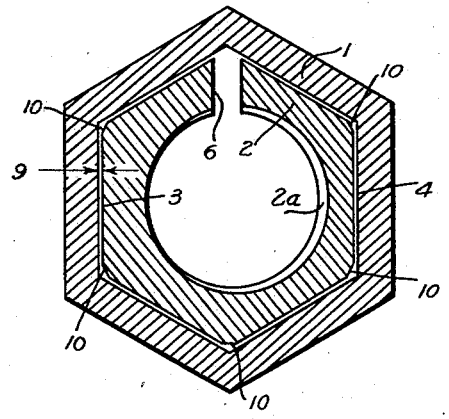
Figure 2 is a horizontal cross sectional view of Figure 1 along the plane of the line 2—2.
Figure 3:
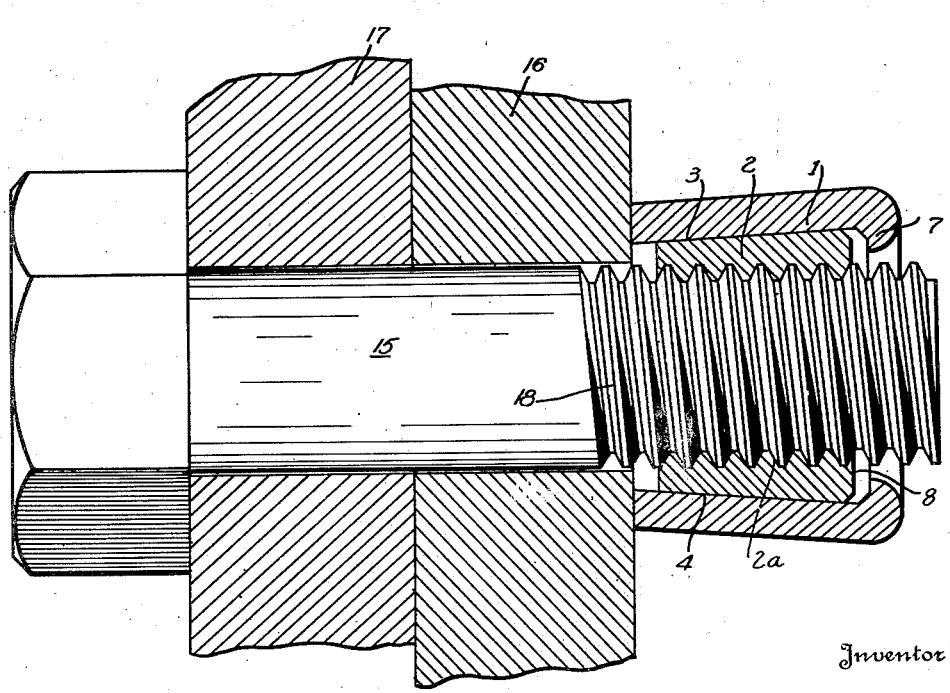
Figure 3 is a sectional view showing the lock nut cooperating in locked position with a bolt.

Referring to Figures 1, 2 and 3, the completed lock nut constructed in accordance with this invention, comprises a plurality of nested members 1 and 2. The outer member 1 is comprised of a shell-like stamping having an internal axial taper. The inner member 2 is comprised of a die-formed member having an external axial taper adapted to engage the internal taper of the outer member 1 when said members are in nested relation. The inner member 2 has internal threads 2a adapted to engage the threads of a bolt as shown in Figure 3.

The inner member 2 has tapered external axial surfaces 3, which have the same angle of taper as inner surfaces 4 of the outer member 1. The outer dimensions of the inner member 2 are such as to allow substantial axial movement between the members before the tapered surfaces 3 and 4 engage. A slot 6 machined in the member 2 allows the latter to contract when the inner member 2 is forced axially relative to the member 1 in the direction toward which the surfaces 3 and 4 converge. A rim 7 on the end of member 1 toward which the surfaces diverge, engages a rounded edge 8 on member 2 to limit the relative axial movement of the two members and at the same time provides that the two members may be handled as a unit. In Figures 1 and 2 the clearance between the members is shown at 9. Corners 10 of member 2 are taken off to prevent binding in the outer member. In Figure 3, the lock nut cooperates with a bolt 15 to secure together, members 16 and 17. As the inner member 2 is screwed down on the bolt 15, the outer member 1 engages the member 16. Continued rotation of the nut causes the inner member 2 to move axially relative to the outer member 1 toward the member 16. Due to the tapered surfaces 3 and 4 the inner member will contract causing threads 2a to grip threads 18 on the bolt 15. The greater the axial force on the outer member 1 of the lock nut, the greater will be the gripping friction between the threads. A lock nut of hexagonal shape is shown but it will readily appear to one skilled in the art that the shape is immaterial so long as there is a non-rotatable connection between the inner and outer members.

The major feature of this invention resides in the method of manufacturing a lock nut of the type described, whereby the unit may be made on a quantity production basis at a cost low enough to favorably compare with the conventional nut. Broadly speaking, self-locking nuts similar to the type herein described are known in the art. However, they have never attained commercial success because of the excessive cost of milling tapered external and internal contours on the complemental parts. Specially designed apparatus is necessary to cut the peculiarly shaped contours, and the cutting operation is necessarily slow.

I have found that by stamping the outer member, using a very simple die, the contour of the surfaces may be shaped as desired and made on a quantity production basis at a very low cost per unit. Furthermore, the correct external contour of the threaded member can be cheaply made by upsetting a metal blank.

In the manufacture of the lock nut in accordance with this invention as will be explained in connection with Figures 4 to 9, inclusive, the outer member 1 is stamped from a disc-shaped blank 20 of uniform thickness. The female die used has an internal tapered hexagonal shape. The disc blank is pressed into the female die by means of a male die having an external tapered outer surface, the size of which is smaller than the female die to allow for the space taken by the blank. The blank will then have a shape as shown in Figures 6 and 7 upon completion of the stamping operation.

It is to be noted that this operation produces the outer nut member with an internal tapered hexagonal shape. This very greatly reduces the cost of manufacture since the internal tapered shape does not have to be milled as in the manufacture of similar prior devices of this type.

The stamping operation leaves a rim 21 at right angles to the outer surface of body portion 22. The rim 21 and a section 23 in the end of the body are then cut from the body portion 22. The stamping and the cutting operations may be done by separate machines or they may be performed at one operation by the same machine. After the cutting operation is performed the body appears as in Figure 8. The right hand end of the body 22 is then ground off to the line indicated at 24—24. The inner member 2 is then inserted and the edge 26 is peened over forming the rim 7 in the finished lock nut as shown in Figures 1, 2 and 3.

The inner member 2 is preferably made by an upsetting operation. This eliminates the expensive operation of cutting a hexagonal taper on the outer surface. A blank 27, from which the inner member 2 is made, is first heated to the desired temperature and placed in a female die 28 having a tapered internal hexagonal shape. A male die 29 then presses the blank 27 to conform to the inner dimensions and shape of the female die 28. The blank 27 is then removed from the die and the end surfaces are trued by machining. It is next bored and threaded after which the slot 6 is milled. These operations complete the manufacture of the inner member 2 and it is then inserted in member 1.

This invention is not limited to the particular sequence of steps nor to the exact operations described. It contemplates broadly the idea of a lock nut which is cheap to manufacture in that the inner and outer members, including their tapered surfaces, are formed to the desired shape by simple die forming steps rather than by expensive machining operations. The body of the outer member 1 is shown as stamped from a disc blank of uniform thickness thereby making the contour of the external surface tapering with the inner surface. This external taper will prevent a wrench from slipping off when operating the nut. Any ordinary adjustable wrench may be used but a special wrench having surfaces with the same angle of taper as that of the nut would obtain better surface contact.

It will be obvious to one skilled in the art that the outer member may be made from a blank of such shape that the nut member may have any desired degree or direction of outside taper.

For example, the blank may be a disc, the central portion of which is thicker than its edges, thereby obtaining a nut member having an internal tapered surface but having an outer polygonal surface, the sides of which are parallel to the nut axis.

In spite of the fact that the nut is made of two nested members, it is possible to keep the outside dimensions thereof within the limits specified for U. S. Standard nuts.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A lock nut comprising a pair of nested members consisting of an internally threaded longitudinally split integral member, the outer surface of said member having a taper, a second member having a taper on its internal surface adapted to engage the taper of said first member, said second member having an external surface parallel to its internal surface.

2. In a lock nut consisting of a shell-like member having axially tapered internal and external surfaces and a second internally threaded member arranged to be retained within said shell-like member at all times and to have slight axial movement with respect thereto.

3. The method of making a lock nut comprising a plurality of nested members in which said nested members have complemental engaging surfaces adapted to prevent rotational movement therebetween, which method comprises the step of shaping one of said members from a blank into a closed shell-like form having an inner periphery defined by a plurality of plane surfaces inclined to the axis of said lock nut, upsetting another of said members to provide external plane surfaces thereon to complementally fit in said shell-like member to limit axial movement therebetween in one direction, inserting said second member into said first member and peening over at least a portion of one end of said shell-like member to limit the axial movement between said members in the other direction.

4. The method of making a lock nut which comprises stamping a disc blank into a shell-like member having an internal periphery comprising a plurality of plane surfaces inclined to the axis of said member, upsetting a second member to form thereon an external periphery comprising a plurality of plane surfaces inclined to the axis of said second member, inserting said second member into said first member and peening over at least a portion of one edge of said first member to limit the relative axial movement of said members.

5. A lock nut comprising an internal member and an external member having complementary tapered surfaces, said internal member being internally threaded and provided with a longitudinal slot, and said external member having parallel interior and exterior surfaces; and means for preventing relative separation of said internal and external members.

6. A lock nut comprising an internal member and an external member provided with cooperating, tapered polyhedral surfaces, said internal member being internally threaded and provided with a longitudinal slot, said external member being of uniform thickness; and means for preventing separation of said internal and external members.

7. A lock nut comprising an internal member and an external member provided with complementary polyhedral surfaces having longitudinal taper, said taper preventing separation of said internal member with respect to said external member in the direction of advance of said nut, said internal member being internally threaded and provided with a longitudinal slot to allow variation in the diameter of said internal member in response to relative longitudinal displacement of said internal member with respect to said external member, said external member having parallel interior and exterior surfaces; and means for retaining said internal member within said external member at all times.

8. A lock nut with one integral internally threaded inner member and an outer member complementally associated for unitary rotation, said outer member having internal and external tapered surfaces formed from a blank of uniform thickness, said tapered surfaces having a greater length longitudinally than said inner member.

9. A lock nut comprising a pair of nested members consisting of a longitudinally split interiorly threaded integral internal member, the outer surface of said member having a taper, a second stamped member having a taper on its internal and external surfaces, said internal taper adapted to engage the taper of said first member said second member extending beyond the tapered surface of the internal member.

MATHEW B. MORGAN.